United States Patent [19]

Maekawa et al.

[11] Patent Number: 5,774,073
[45] Date of Patent: Jun. 30, 1998

[54] NAVIGATION SYSTEM FOR A VEHICLE

[75] Inventors: Kazuteru Maekawa, Aichi-ken; Toyoji Hiyokawa, Toyota; Hiroyuki Kanemitsu, Susono, all of Japan

[73] Assignee: Aisin AW Co., Ltd., Japan

[21] Appl. No.: 466,191

[22] Filed: Jun. 6, 1995

[30]     Foreign Application Priority Data

Sep. 22, 1994   [JP]   Japan .................................... 6-254847

[51] Int. Cl.$^6$ ................................................... G08G 1/123
[52] U.S. Cl. ........................... 340/995; 340/990; 701/210
[58] Field of Search ..................................... 340/995, 990,
               340/988; 364/449, 444; 701/208, 209, 210

[56]                References Cited

U.S. PATENT DOCUMENTS

| | | | |
|---|---|---|---|
| 4,926,336 | 5/1990 | Yamada .................................... | 340/995 |
| 5,220,507 | 6/1993 | Kirson ..................................... | 340/995 |
| 5,243,528 | 9/1993 | Lefebvre .................................. | 340/995 |
| 5,272,638 | 12/1993 | Martin et al. ............................ | 340/995 |
| 5,291,413 | 3/1994 | Tamai et al. ............................. | 340/995 |
| 5,442,349 | 8/1995 | Inoue et al. .............................. | 340/995 |
| 5,506,774 | 4/1996 | Nobe et al. .............................. | 340/995 |
| 5,513,110 | 4/1996 | Fujita et al. ............................. | 340/995 |
| 5,550,538 | 8/1996 | Fujii et al. ............................... | 340/995 |

*Primary Examiner*—Brent A. Swarthout
*Attorney, Agent, or Firm*—Lorusso & Loud

[57]                ABSTRACT

The present invention provides a navigation system for guiding a driver along an optimum route by comparing a route with preference on the traveling direction of a vehicle with a route with no preference on the traveling direction thereof when the driver is guided from the current position thereof up to a destination. To search for a route, a first route with preference on the traveling direction of a vehicle is calculated (1) and then, a second route with no preference on the traveling direction thereof is calculated (2). An appropriate route is selected from found routes according to a predetermined setting condition (3) and displayed on screen. The setting condition includes comparison of distances of respective routes and time lengths required for traveling thereon, ease of traveling, width and type of roads, scenery and the like. In a case where distances of the respective routes, for example, are compared with each other, if the distance of the first route is longer than the second route by at least a predetermined value, the second route is displayed, and if the first route is not longer than the second route by at least the predetermined value, the first route is displayed.

7 Claims, 17 Drawing Sheets

NAVIGATION SYSTEM FOR A VEHICLE

BACKGROUND OF THE INVENTION

1. Field of the Invention

The present invention relates to a navigation system for a vehicle which guides a vehicle driver along a route to a destination and, more particularly, to a navigation system for a vehicle which is capable of finding an optimum route.

2. Description of the Related Art

The navigation system for a vehicle has various functions for guiding a vehicle driver along a route specified by a driver. One of the functions is to re-search for a route when the vehicle goes off a specified route and to restart the guiding along the found route.

A driver may sometimes go off a specified route when driving according to instructions about the route. As a countermeasure for this event, for example, Japanese patent application laid-open No. HEI1-173815 has disclosed such a function for immediately informing a driver that the vehicle has been off a set route and re-searching for a new route. However, the system of Japanese patent application laid-open No. HEI1-173815 has a problem in that it takes a long time searching for a new route because the disclosed system searches over all routes from its current position to a destination when a vehicle goes off the route. Japanese patent application laid-open No. HEI6-68389 discloses a navigation system for a vehicle which is intended to solve the above-described problem.

According to the-aforementioned Japanese patent application laid-open No. HEI6-68389, when the system determines that a vehicle is off a specified route, a re-search switch is displayed, and when operation of the re-search switch is detected, the system executes a search of a route for returning to the previous route. In this system, when an operation of searching or re-searching for a route is detected, a route is searched for with preference for the traveling direction of a vehicle. Because a route is found with preference for the traveling direction of a vehicle as described above, if there is only one unforked road going through, for example, a mountainous area, the system may sometimes guide along a roundabout route. Thus, there is a problem in that the system may guide along a route which is not favorable for a user.

SUMMARY OF THE INVENTION

An object of the present invention is to solve the above-described problem and provide a navigation system for a vehicle which is capable of guiding a driver along an optimum route to a destination when the vehicle goes off a previously specified route.

Another object of the present invention is to provide a navigation system for a vehicle which is capable of guiding a driver along an optimum route from a current position to a destination.

To achieve the above-described objects, a first embodiment of the navigation system for a vehicle of the present invention comprises: destination setting means for setting a destination; memory means for storing map information and guide information; current position detecting means for detecting a position of a vehicle and traveling direction thereof; route search means for searching for a route from a current position to a destination on the basis of information stored in said memory means; route-off detecting means for determining whether a vehicle is off a route on the basis the result of said detection by said current position detecting means and information of said memory means; re-search means for researching for a route on the basis of information of said memory means when said route-off detecting means determines that a vehicle is off a route; and guide means for providing guidance on the basis of a route found by said re-search means. The re-search means includes: first route search means for searching for a route to a previous route with preference for the traveling direction of a vehicle obtained by said current position detecting means, second route search means for searching for a route to a previous route with no preference for the traveling direction of a vehicle obtained by said current position detecting means, and comparative determining means for comparing a first route and a second route found by said first route search means and said second route search means, respectively, and selecting one of the first and second routes.

In the first embodiment of the invention, because the navigation system calculates a first route up to a previous route with preference for the traveling direction of a vehicle and a second route up to the previous route with no preference for the traveling direction thereof and performs comparative determination, that is, examines and compares the first route and the second route under a specified condition, it is possible to indicate an optimum route from a current position up to a destination to a driver according to the result of the comparative determination. Because the navigation system re-searches for a route up to the previous route, it requires less time for calculation than a method which re-searches for an entire route all the way to the destination.

After the first and second routes are compared with each other under a specified condition, the first route is indicated except when the second route is determined as a far more advantageous route than the first route. Thus, it is always possible to provide a driver with an optimum route.

In a mountainous area or the like, where there are few forked roads, the system may sometimes guide along a first route even if it is a far longer distance than the second route. However, the system can use a condition whether the first route is longer than the second route by at least a predetermined distance to select either one of them. If the first route is longer by at least the predetermined distance, guiding of the first route is canceled. As a result, a driver will know that he should change routes because the current route is a roundabout way.

A second embodiment of the navigation system for a vehicle of the present invention comprises: destination setting means for setting a destination; memory means for storing map information and guide information; current position detecting means for detecting a position of a vehicle and traveling direction thereof; route search means for searching for a route from a current position to a destination on the basis of information stored in said memory means; and guide means for providing guidance on the basis of a route found by said route search means; said route search means including: first route search means for searching for a route to a destination with preference for the traveling direction of the vehicle obtained by said current position detecting means, second route search means for searching for a route to the destination with no preference for the traveling direction of the vehicle obtained by said current position detecting means, and comparative determining means for comparing a first route and a second route found by said first route search means and said second route search means, respectively, and selecting one of the first and second routes.

Further, in the second embodiment of the invention, it is possible to provide a user with an optimum route from a current position up to a destination by comparing the first route selected with preference for the traveling direction of a vehicle and a second route selected with no preference for the traveling direction thereof.

BRIEF DESCRIPTION OF THE DRAWINGS

FIG. 5 is a diagram showing an example of representation of the entire route provided after a new route is re-searched for.

DETAILED DESCRIPTION OF THE PREFERRED EMBODIMENTS

Figure 2:
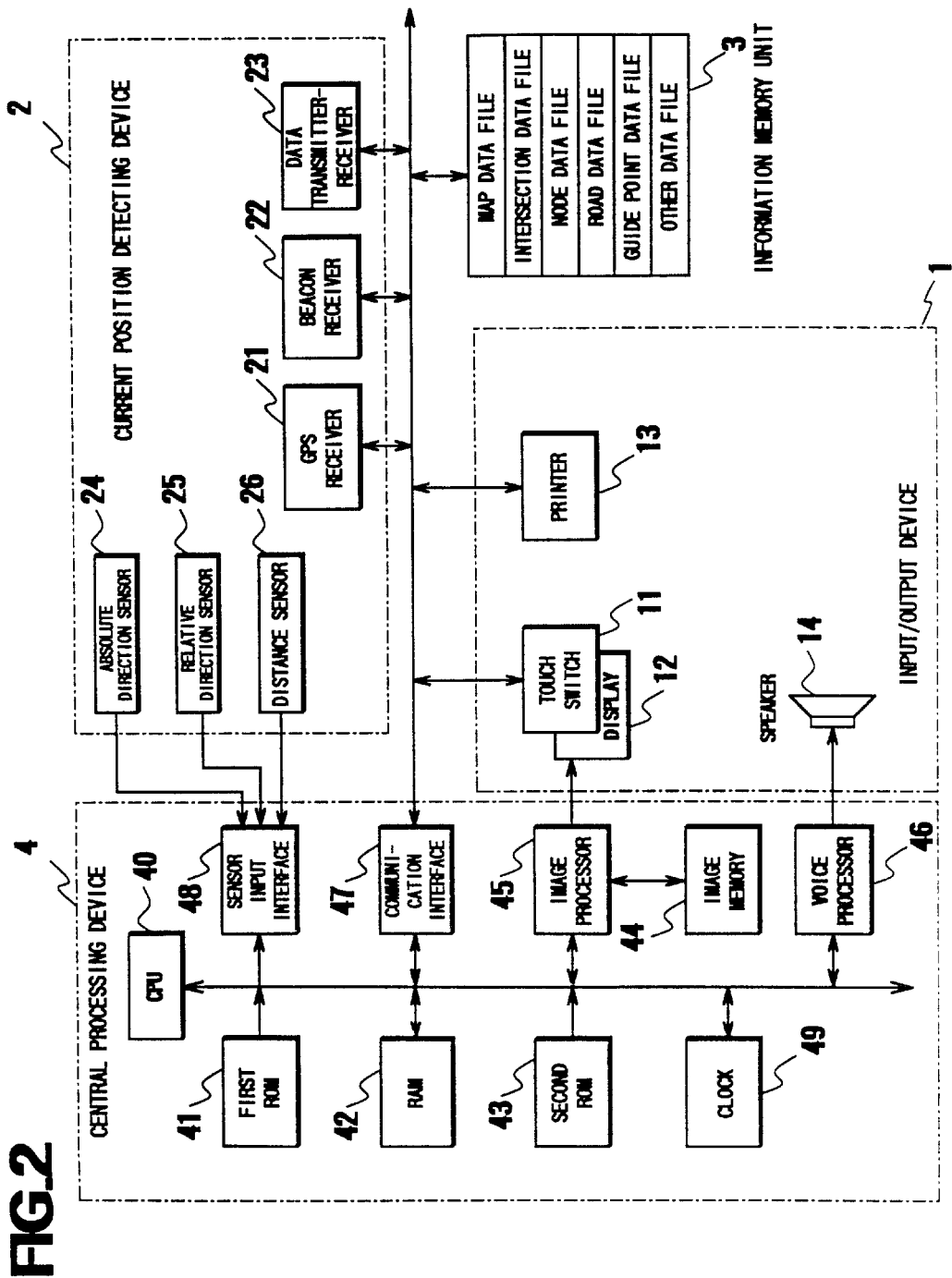
FIG. 2 is a diagram showing the construction of the hardware of the navigation system for a vehicle.

Hereinafter embodiments of the present invention will be described with reference to the accompanying drawings. FIG. 2 shows the construction of a navigation system of the present invention.

Referring to FIG. 2, the navigation system comprises an input/output device 1 for inputting and outputting information relating to route guide, a current position detecting device 2 for detecting information about the current position of the vehicle, an information memory unit 3 for storing navigation data necessary for calculating a route and guide data necessary for route guide and the like, and a central processing device 4 for performing the processing for search of a route and the processing of display and voice necessary for route guide, and for controlling the overall system.

The input/output device 1 has a function for instructing the central processing device 4 to perform navigation processing at the will of a driver in order to enter information necessary for setting a departure point, a destination, passing points and the like and to indicate guide information in the form of voice and/or displayed image when required by him, and a function for printing out processed data, data received through data transmission and the like. As a means for realizing the function, the input section comprises a touch switch 11 for entering addresses, telephone numbers, coordinate values and the like, and requesting a route guide. The output section comprises a display 12 for displaying entered data and displaying a route guide automatically or at the request of the driver, a printer 13 for printing out data processed by the central processing device 4, data stored in the information memory unit 3 and data received through transmission, and a speaker 14 for outputting a route guide in the form of a voice.

A display 12 is constructed by a color CRT or a color liquid crystal display, and displays all the pictures necessary for navigation in color, such as a destination setting picture, a sectional picture, an intersection picture and the like based on map data and guide data processed by the central processing device 4. Function keys are displayed for setting a route guide and changing route guides currently selected and pictures to be displayed. The display 12 is provided with touch switches 11 corresponding to the indications of the function keys. Then, the above-described operations are executed according to a signal entered through the touch key.

The current position detecting device 2 comprises a GPS receiver using a satellite navigation system (global positioning system (GPS)) 21, a beacon receiver 22, a data transmitter-receiver 23 for receiving GPS correction signals using, for example, mobile phone or FM multiple signals, an absolute direction sensor 24 comprising, for example, a geomagnetic sensor, a relative direction sensor 25 comprising, for example, a wheel sensor, a steering sensor or the like, and a distance sensor 26 for detecting a traveling distance according to the number of revolution of a wheel, in order to detect the traveling direction and coordinates of the position of a vehicle and the like.

The information memory unit 3 comprises a map data file for storing, for example, map information necessary for route guide, an intersection data file for storing information concerning intersections, a road data file for storing information concerning roads such as road types, beginning/end of a road and the like, a node data file for storing coordinates of the longitude and latitude at a point of a road, a guide map data file for storing coordinates of the position of a marked object, guide information concerning a marked object and the like, and so on.

The central processing device 4 comprises a CPU 40 for executing arithmetic operations, a first ROM 41 for storing programs for processing the searching for a route, programs for display control necessary for route guide and voice output control necessary for voice guide, and data necessary therefor, a RAM 42 for temporarily storing road information (road string data) after search for a road or re-search for a road, route guide information and data provided during arithmetic operation, and a second ROM 43 for storing display data necessary for route guide and map representation. The central processing device 4 includes an image memory 44 for storing image data to be used for display on a screen, an image processor 45 for picking out image data from the image memory according to display control signal from the CPU 40, performing image processing and then outputting the processed data to a display, a voice processor 46 for synthesizing voice data (phrase, sentence, sound and the like) read from the information memory unit 3 according to voice output control instructions from the CPU and for converting the synthesized signals to analog signals and outputting the converted data to a speaker, a communication interface 47 for sending and receiving input/output data through transmission, a sensor input interface 48 for receiving a sensor signal of the current position detecting device 2 and a clock 49 for writing date and time into internal dial information. Here, the route guide is constructed for enabling a driver to select either image display or voice output.

The system of the present invention calculates an estimated position according to various sensor signals and GPS data for detecting a current position and determines a position on a road according to the relation between the estimated position, a road on a map and GPS data in order to obtain a current position. Further, this system has a function for determining whether or not a vehicle is approaching a predetermined guide point by defining the current position with reference to a route up to a destination. Namely, the aforementioned function determines the timing of automatic voice output of a predetermined distance before an intersection on a guide route, determination of passing an intersection and the like, and the timing of intersection information display output of, for example, the name of an intersection which a vehicle has passed. According to the result of this determination, a guide instruction is transmitted to the image processor and the voice processor. When a request signal is entered, the voice processor is instructed to perform voice guide about a current position. The voice guide of this system is output from a voice output section by synthesizing voice data (phrase, sentence, sound and the like) voice data read from the information memory unit 3 and converting the synthesized signal to analog signal.

Figure 1:
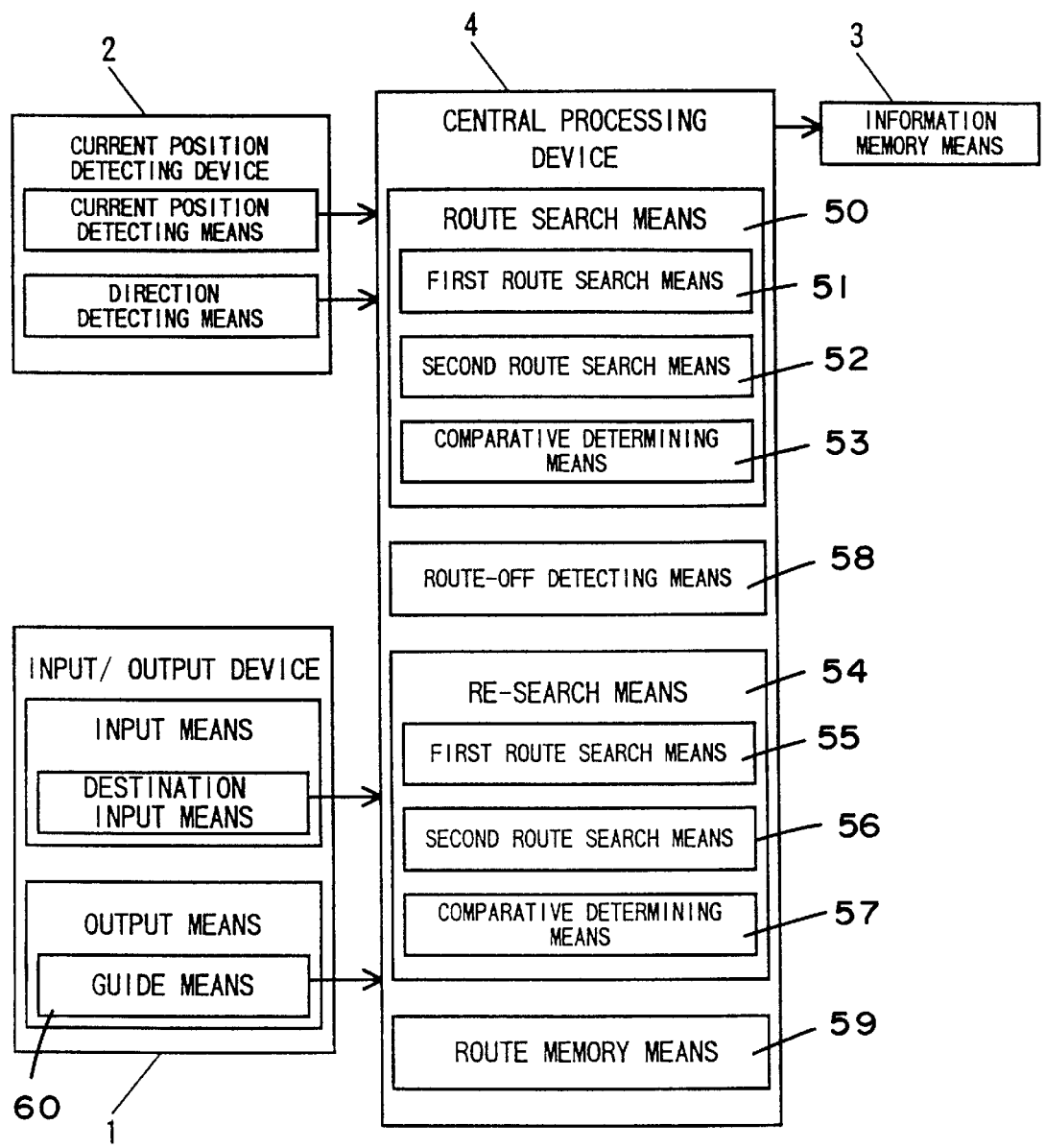
FIG. 1 is a block diagram showing the construction of a navigation system for a vehicle of the present invention.

The construction of the hardware of the navigation system for a vehicle according to the present invention will be described. FIG. 1 shows the construction of the first embodiment of the invention for executing a re-search for an optimum route when a vehicle goes off a route and the construction of the second embodiment of the invention for executing a search for all the routes relating to a route from a current position to a destination as well as initial setting of a route from the current position up to the destination, in the form of a single block diagram.

Referring to FIG. 1, the central processing device 4 comprises various means for searching for a route, determining whether a vehicle is off a route and re-searching for a route, on the basis of object information entered by an object input means, current position information and traveling direction information from the current position detecting device 2 and map information from the information memory unit 3. Route guide information processed by the central processing unit 4 is provided through guide means as an output means, for example, a display unit or voice output unit, to a driver.

The route search means 50 comprises a first route search means 51 for searching for a route up to a destination with preference for the traveling direction of a vehicle obtained from the current position detecting device 2, a second route search means 52 for searching for a route up to the destination with no preference for the traveling direction of a vehicle obtained by the current position detecting device 2 and a comparative determining means 53 for determining a route by comparing the first route found by the first route search means 51 with the second route found by the second route search means 52.

The route re-search means 54 comprises a first route search means 55 for searching for a route up to a previous route with preference for the traveling direction of a vehicle obtained from the current position detecting device 2, a second route search means 56 for searching for a route up to the previous route with no preference for the traveling direction of a vehicle obtained by the current position detecting device 2 and a comparative determining means 57 for determining a route by comparing the first route found by the first route search means 55 with the second route found by the second route search means 56.

The route-off detecting means 58 detects that a vehicle is off a route according to the result of the current position detecting means 2 and the information from the information memory means 3. It is possible to apply a method disclosed in, for example, Japanese Patent Laid-Open No. 1-173815 for this route-off detection.

The route memory unit 59 stores information concerning a route found by the route search means 50, information concerning a route found by the re-search means 54 and the like.

The guide means 60 has functions for displaying a guide route processed by the central processing device 4 on screen and performing a guide by voice. If the route-off detecting means 58 detects that a vehicle is off the route, the guide means 60 executes processing for displaying the re-search keys on the sectional picture screen in order to urge a driver to re-search for a route from a point where the vehicle goes off the previous route.

Figure 3:
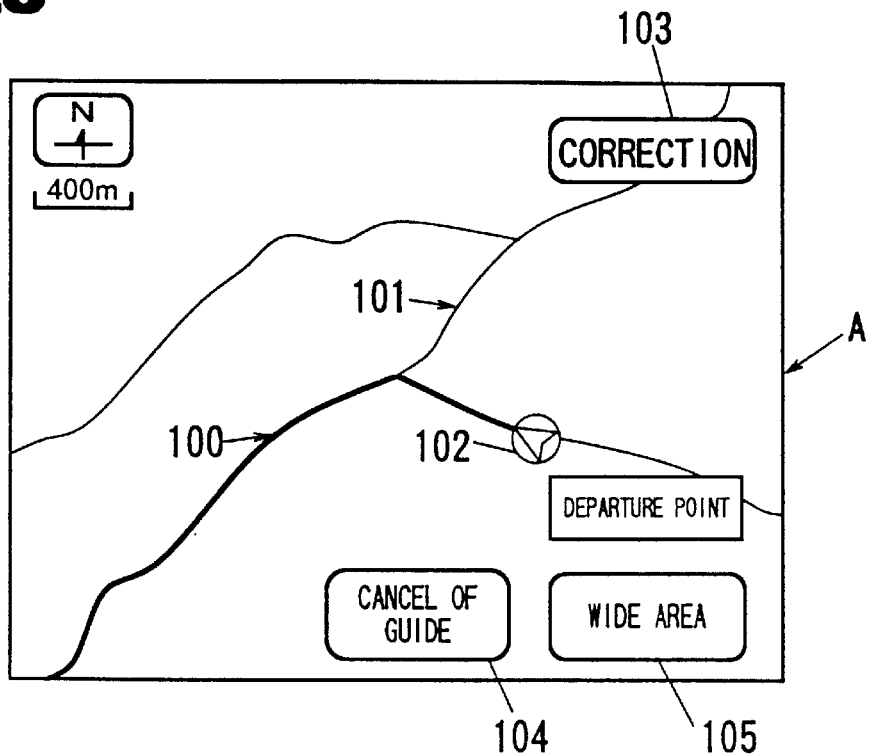
FIG. 3 is a diagram showing an example of a displayed map of a traveling route.

The picture screen displayed on the display unit will be described. On a sectional picture screen A displayed after a guide is started, a route 100 and a road other than the route 100 are displayed as shown in FIG. 3, and a current position mark 102 for indicating the position and the traveling direction of a vehicle are displayed. Additionally, there are provided function keys to be accessed from this screen A. In this example, the route 100 is displayed in red color, and the picture screen contains various function keys, such as a correction key 103 for correcting a current position, a guide cancel key 104 for canceling a route guide and a wide area key 105 for displaying the route all the way to the destination.

Figure 4:
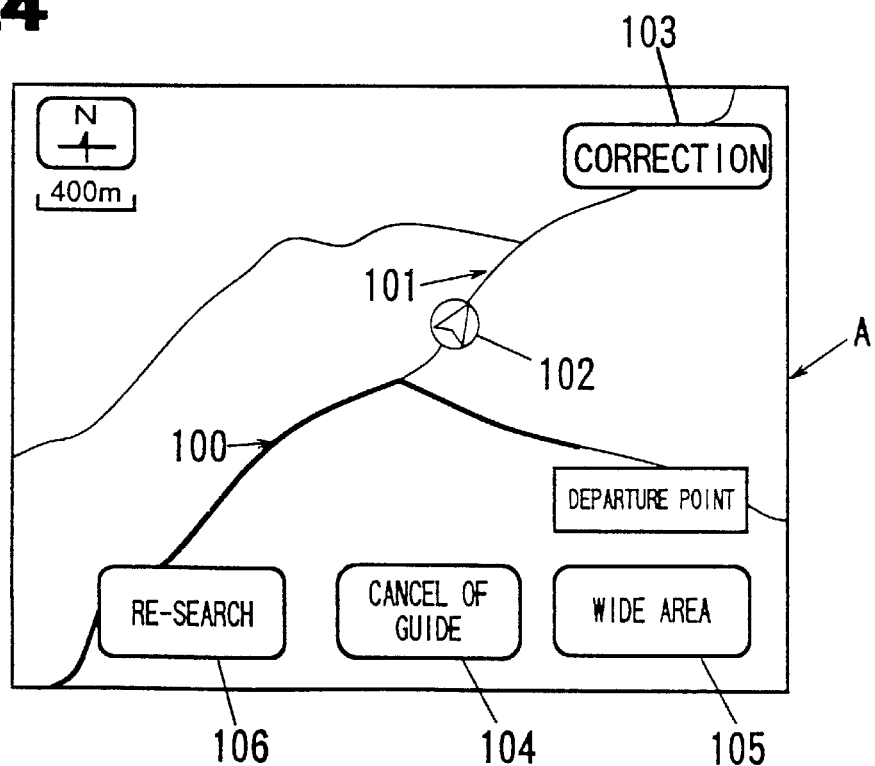
FIG. 4 is a diagram showing an example of a displayed map of a traveling route when a vehicle is off a specified route.

If a vehicle enters a road 101 other than a specified route during route guiding and is off the specified route by a predetermined distance, a re-search key 106 is displayed on the sectional picture screen A as shown in FIG. 4. Pressing the re-search key 106 starts re-search for a route and simultaneously displays "On search" on the picture screen.

Figure 5:
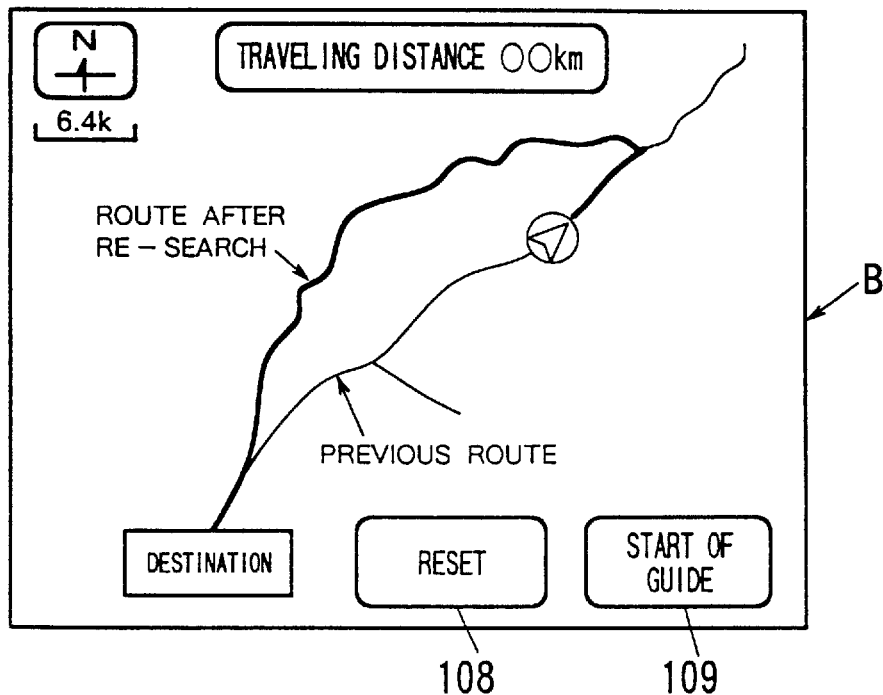

A route meeting the selection conditions set for re-search is adopted to display an entire route after re-search on the display. In an example shown in FIG. 5, a route different from the previously selected route is displayed on the entire route picture screen B together with the road information, for example, distance of the route, expected travelling time, etc. A reset key 108 is displayed on the screen for resetting a destination. Pressing a guide start key 109 starts route guiding for a new route.

Figure 6:
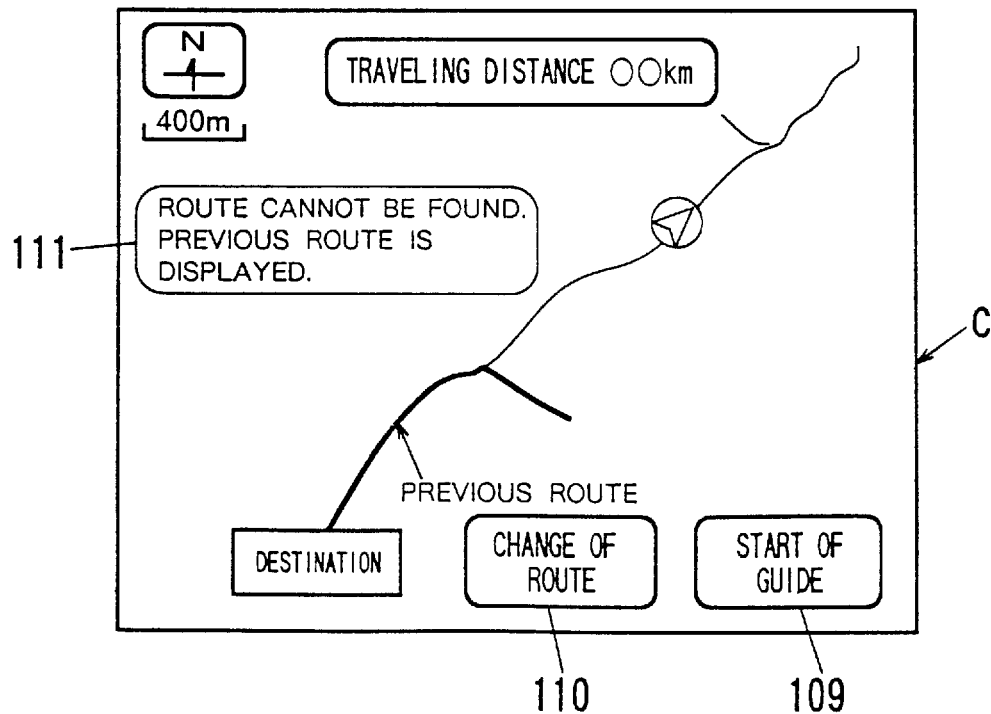
FIG. 6 is a diagram showing an example of a displayed map when search for a route fails.

The example shown in FIG. 6 is a screen displayed if any route conforming to selection condition is not found. On the screen C, the previous route is displayed and simultaneously a message 11 saying that the route cannot be found is displayed.

When the vehicle returns to the previous route, pressing the guide start key 109 enables restarting of the guide. Pressing a route change key 110 enables searching for a new route from the current position to a destination and making a guide along the route.

First embodiment

Figure 7:
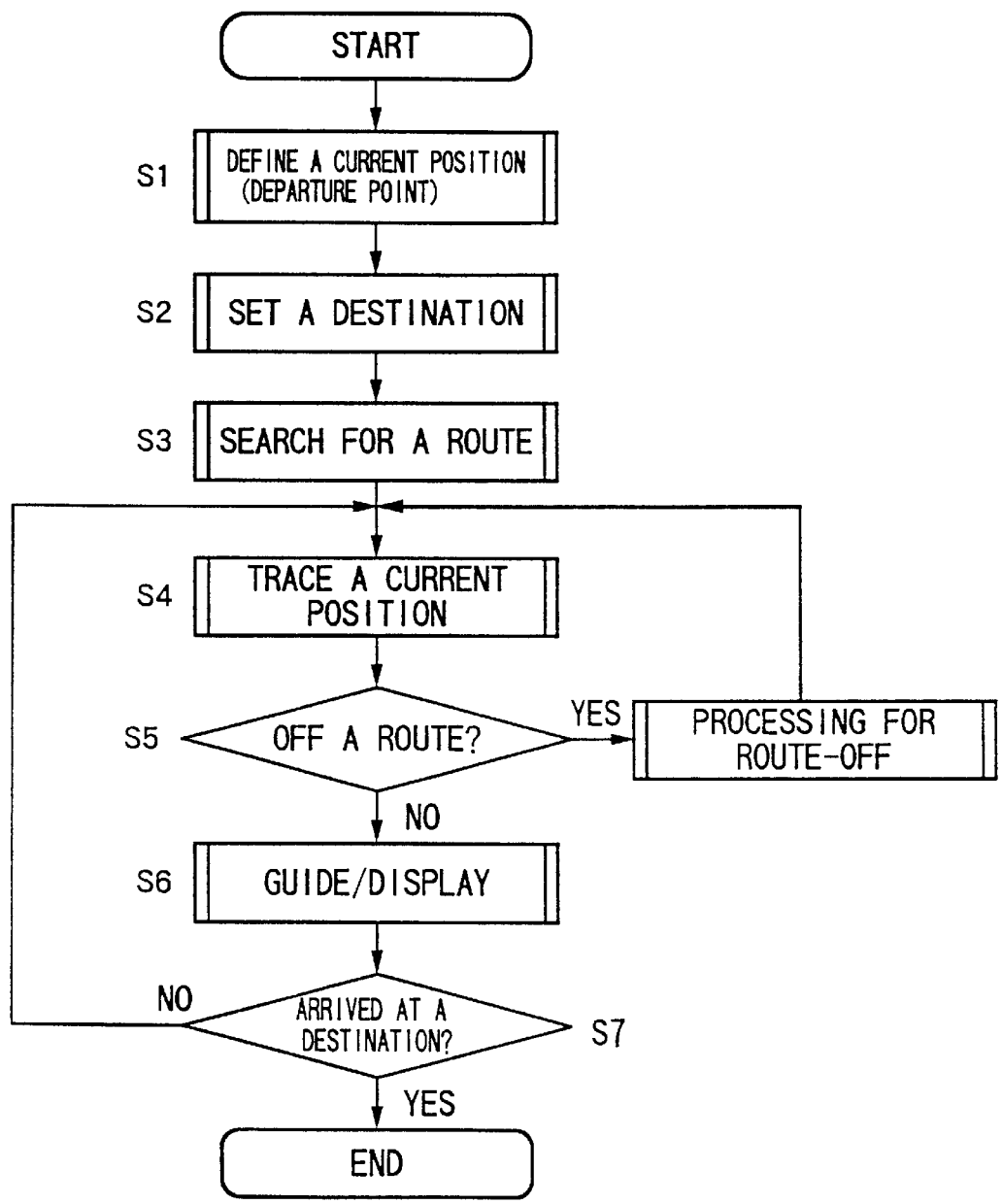
FIG. 7 is a flow chart of processing relating to re-search for a route.

The first embodiment of the navigation system is provided for re-searching for an optimum route when a vehicle goes off a specified route. FIG. 7 shows the flow of operation of the entire system. According to the present embodiment, a current position (departure point) necessary for search for a route is defined (S1), a destination is set by entering a destination setting condition through a destination setting screen (S2) and a route is searched for (S3). With a route found, a guide start key is pressed to start a route guide. Then, the current position of the vehicle is measured and then traced (S4). Next, a distance from the current position up to the set route is obtained and whether the vehicle goes off the route is determined depending on whether or not the distance exceeds a predetermined value (S5). If it is found that the vehicle goes off the route, processing for the route-off is executed. Unless the vehicle goes off the route, guiding the vehicle along the set route continues to be performed together with accompanying display (S6). A remaining distance from the current position to a destination is obtained and an arrival of the vehicle at the destination is determined depending on whether the remaining distance is reduced to a predetermined distance or less (S7). If the remaining distance is the predetermined value or less, it is determined that the vehicle has arrived at the destination, thereby terminating the route guide. On the other hand, if the remaining distance is more than the predetermined value, the processing returns to step S4, thereby executing trace of the current position. Detection of route-off is performed by timer interruption.

Figure 8:
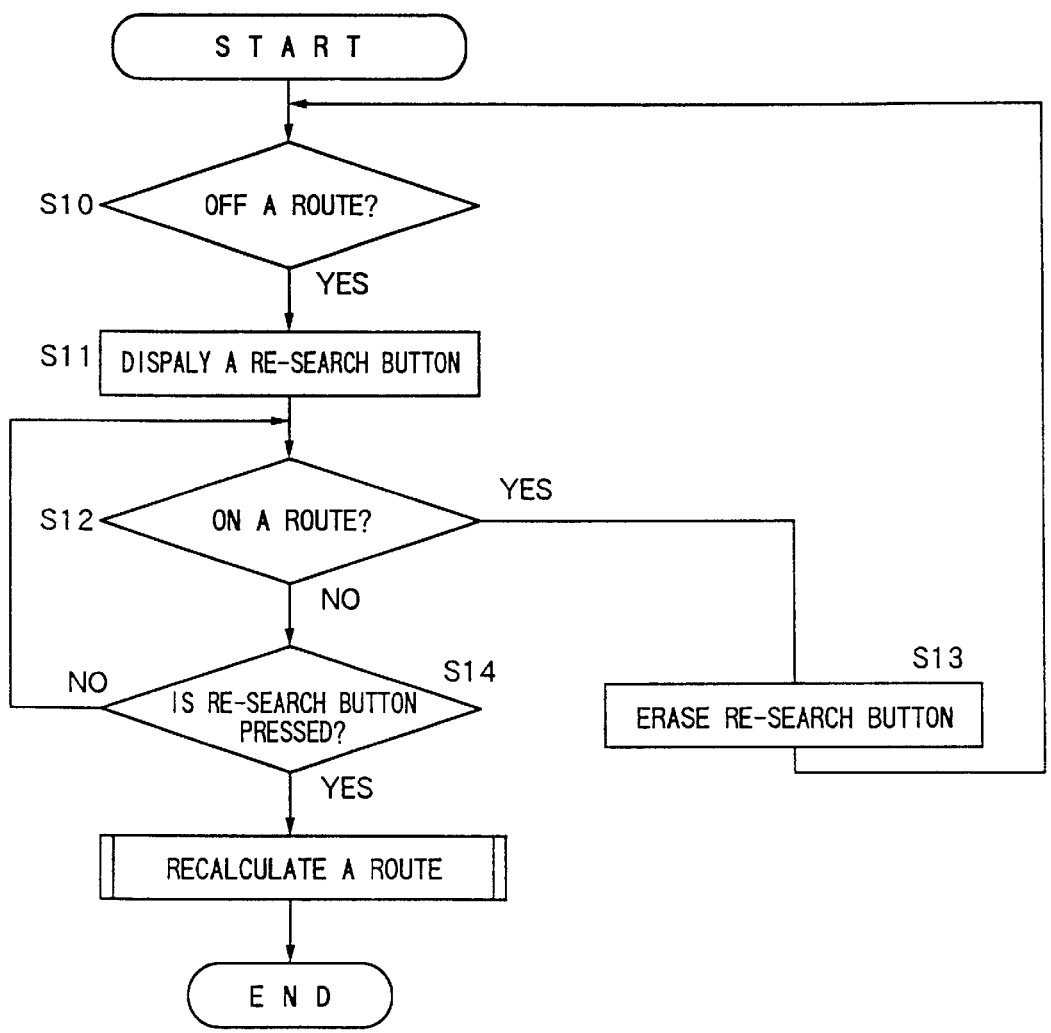
FIG. 8 is a flow chart of processing when a vehicle goes off its specified route.
Figure 9:
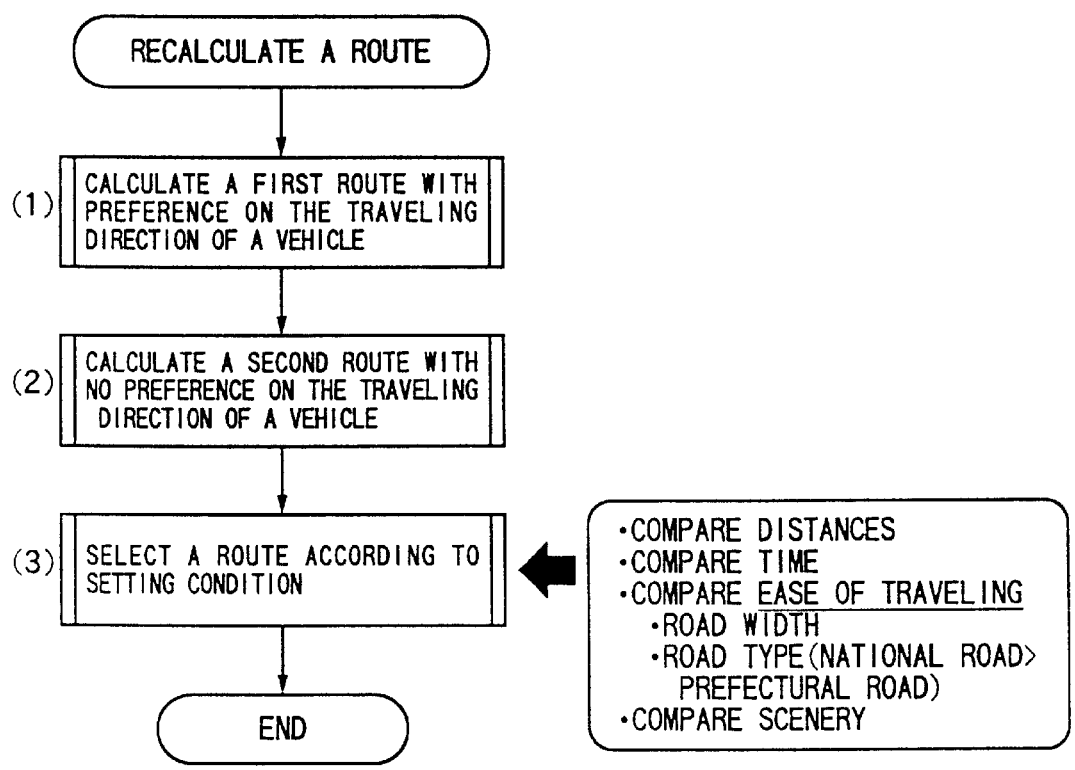
FIG. 9 is a flow chart for recalculation of a route.

If it is detected that a vehicle is off a route on step S5, the processing for the route-off shown in FIG. 8 is performed. That is, if a route-off is detected (S10), a re-search key is displayed on a picture screen as shown in FIG. 4 (S11). Then, whether or not the vehicle is located on the route is determined (S12). The driver may immediately realize that the vehicle is off the route and return to its specified route. In such a case, it is determined that the vehicle is located on the route on step S12, and a display of the re-search key is eliminated (S13) and processing returns to step S10. If it is determined that the vehicle is off the route, whether or not the re-search key is pressed is determined (S14). Unless the re-search key is pressed, whether or not the vehicle is located on the route is determined again (S12). If the re-search key is pressed, the recalculation routine shown in FIG. 9 is started.

In route recalculation, near-by routes from a current position up to a previous route are searched for in order to shorten time required for search. Thus, a first route with preference for the traveling direction of a vehicle is calculated (1) and a second route with no preference for the traveling direction thereof is calculated (2). The calculated first route or second route is selected depending on the setting condition (3). The setting condition mentioned here includes comparisons of the lengths of respective routes and times required for traveling along them, ease of traveling, for example, road width and type (national roads are given preference over prefectural roads), scenery and the like.

The content of the setting condition will be described.

1. Distance

Whether or not the first route has a longer traveling distance than the second route by at least a predetermined distance is determined.

In a mountainous area or the like, where there are few forked roads, the system may sometimes guide along a first route even if it is a far longer distance than the second route. However, the system can use a condition whether the first route is longer than the second route by at least a predetermined distance to select either one of them. If the first route is longer by at least the predetermined distance, guiding of the first route is canceled. As a result, a driver will know that he should change routes because the current route is a roundabout way. Further, because he is prevented from being guided along a very long roundabout way, he can be confident of a shown route and drive his vehicle along the current route confidently, thereby leading to a safer drive.

2. Time

Whether the first route takes longer than the second route by at least a predetermined time is determined by comparison.

In some cases, it may take much shorter for a vehicle to travel along a special road, such as a bypass, than along an ordinary road even if the bypass or the like has a longer distance than the ordinary road. It may be possible to reduce a time required for traveling regardless of traveling distances. Thus, it is advantageous to determine whether or not the first route requires a travelling time longer than that required by the second route by at least a predetermined time. If the first route takes longer by at least the predetermined time, the first route is not adopted for guiding. As a result, a driver will know that it takes longer if he keeps on a current route. Thus, it is possible to show a route which takes as short a time as possible to reach a destination. This function is very effective if a user is in a hurry.

3. Ease of driving

Whether or not the first route is easier to drive on than the second route is determined.

If, for example, types of roads (national road, prefectural road, etc.) are used as criterion about ease of driving a vehicle, the road of the higher class (for example, a national road) is selected from the first and second routes. Driving on a wider road such as a national road makes it easier to recognize current traveling conditions and makes the driver feel confident and secure, thereby leading to reduction of fatigue and a safer drive.

The first and second routes may be compared with respect to the distance, time and ease of driving from a point where the research switch is pressed to a point of connection to a previous route, or with respect to the distance, time and ease of driving from a point where the re-search switch is pressed to a destination.

Figure 10:
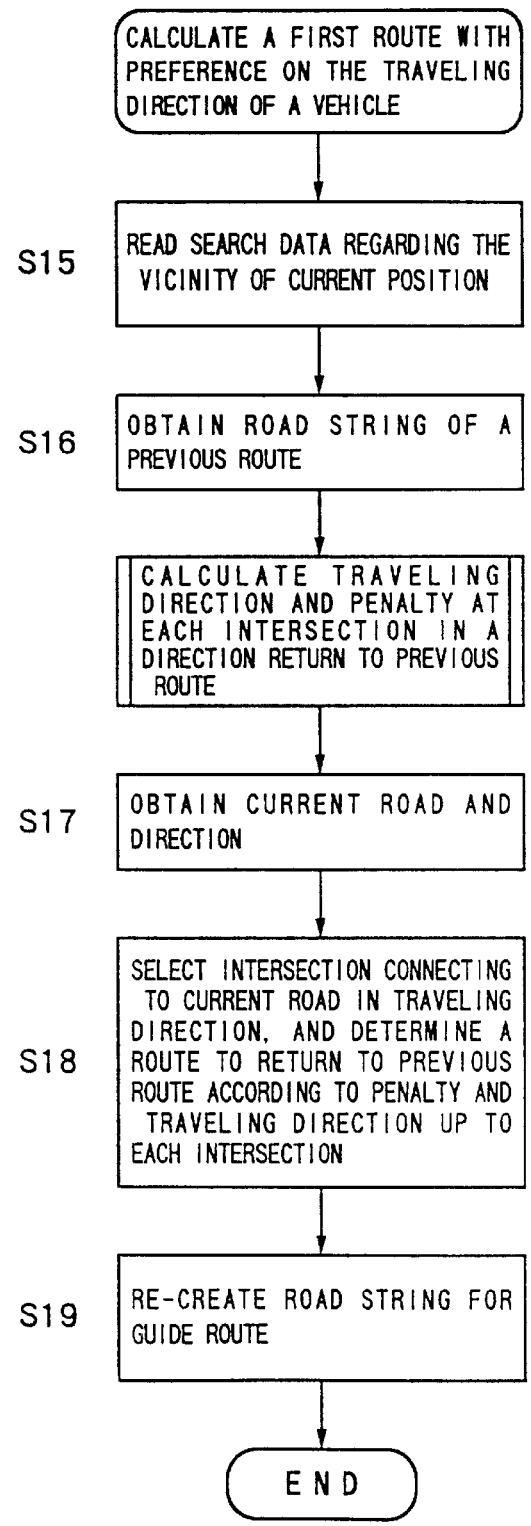
FIG. 10 is a flow chart of a subroutine for calculating the first route with preference for the traveling direction of a vehicle.

Next, calculation of a route will be explained. FIG. 10 shows a subroutine for calculating the first route with preference on the traveling direction of a vehicle. Search data (road data, intersection data, etc.) regarding the vicinity of a vehicle is read from the information memory unit 3 (S15) (see FIG. 14(1)). Road string data of a route shown before a vehicle goes off the route (hereinafter referred to as previous route) is obtained from a route memory means comprising the RAN42 in the central processing device 4 (S16) (see FIG. 14(2)). A route is defined by a road string (route having arrows) obtained by connecting roads between intersections. "Obtain" mentioned here means picking up data from the route memory means into work area of the route search means or re-search means shown in FIG. 1. Then, the traveling direction of a vehicle for returning to the previous route and related penalties are calculated (FIG. 14 (3)). The penalty mentioned here means a value determined according to the type, length and width of a road, turning to the right or left, presence of a traffic signal, traffic regulation and the like. If the previous route cannot be accessed due to prohibition of entry, one-way pass or the like or U-turn occurs, the penalty at that time is made as "∞".

Figure 14:
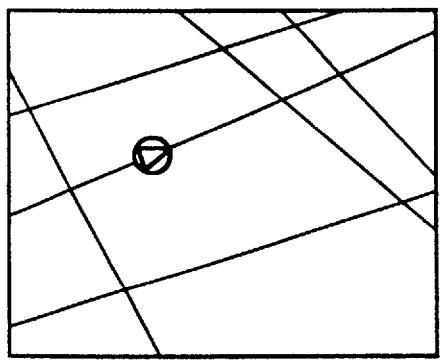
FIG. 14 shows diagrams for explaining the content of each processing for recalculation of near-by routes.
Figure 14:
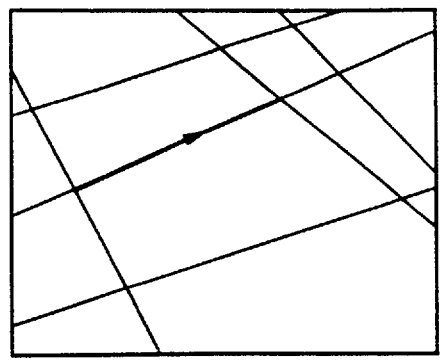
Figure 14:
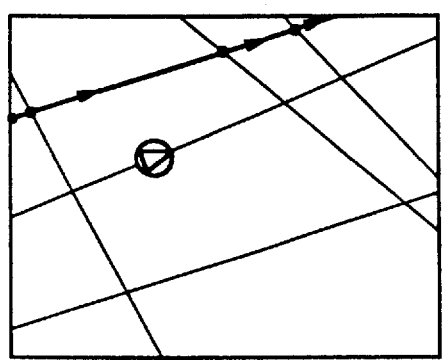
Figure 14:
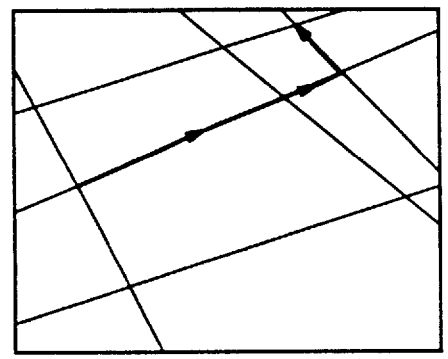
Figure 14:
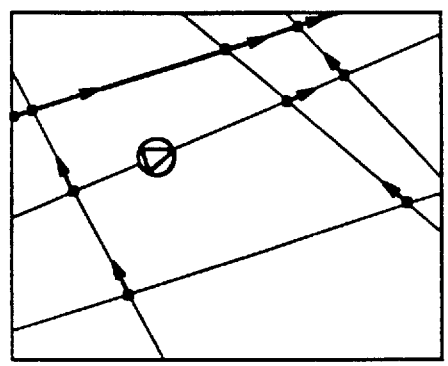
Figure 14:
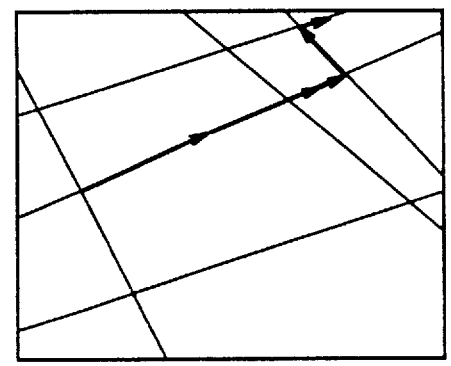

The road in which the vehicle is currently located and the traveling direction thereof are obtained according to the current position information from the current position detecting device and the map information from the information memory unit (S17) (see FIG. 14(4)). Successively, an intersection to which the current position road is connected in the traveling direction thereof is selected and a route for returning to the previous route is determined according to the penalties and the traveling direction up to each intersection (S18) (see FIG. 14(5)). With a found route (new route) and the previous route ahead thereof, an appropriate road string is created as a future guide route (see FIG. 14(6)).

Figure 11:
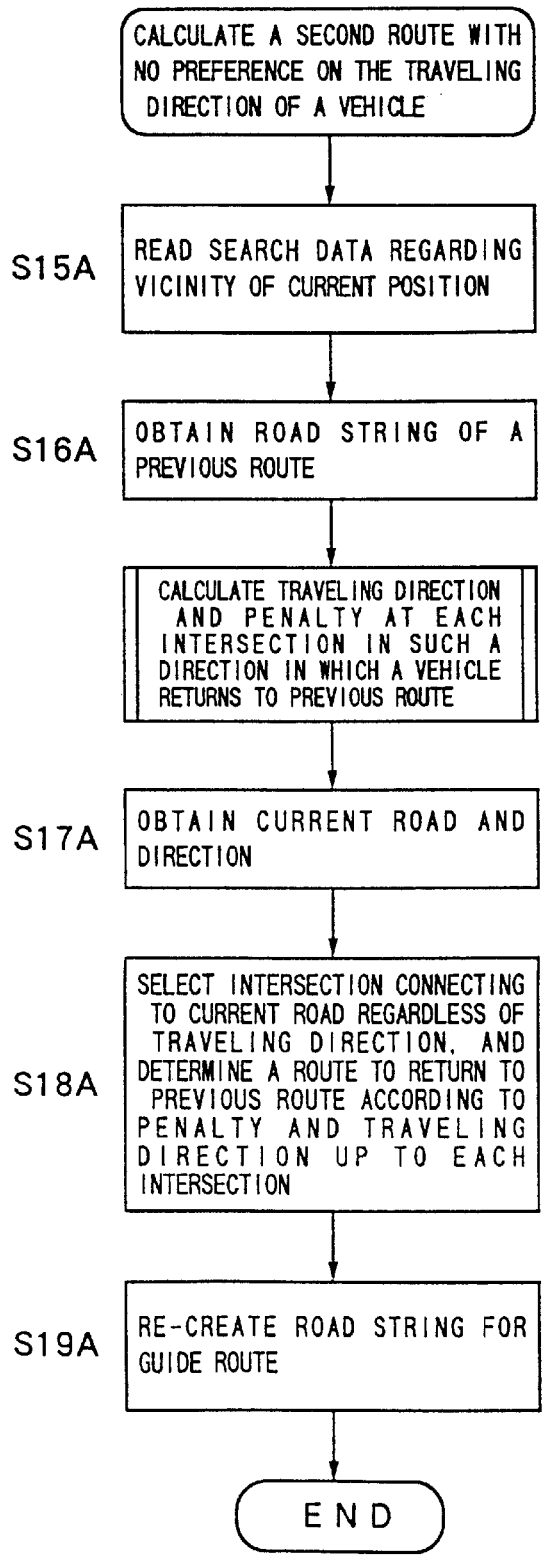
FIG. 11 is a flow chart of a subroutine for calculating the second route with no preference for the traveling direction of a vehicle.

FIG. 11 shows a subroutine for calculating the second route with no preference for the traveling direction thereof. Search data regarding the vicinity of the vehicle is read from the information memory unit (S15A). Then, the road string data of the previous route is obtained from the route memory means (S16A). The traveling direction and penalty at each intersection in a direction in which the vehicle returns to the previous route are calculated according to the subroutines shown in FIGS. 12 and 13. A current position road and traveling direction are obtained according to the current position information from the current position detecting device and the map information from the information memory unit (S17A). Subsequently, intersections connecting to the current position road are selected regardless of the traveling direction and then a route for returning to the previous route is determined according to the penalty and traveling direction thereof up to each intersection (S18A). With a found route and a previous route ahead thereof, a new road string is created as a future guide route (S19A).

Figure 12:
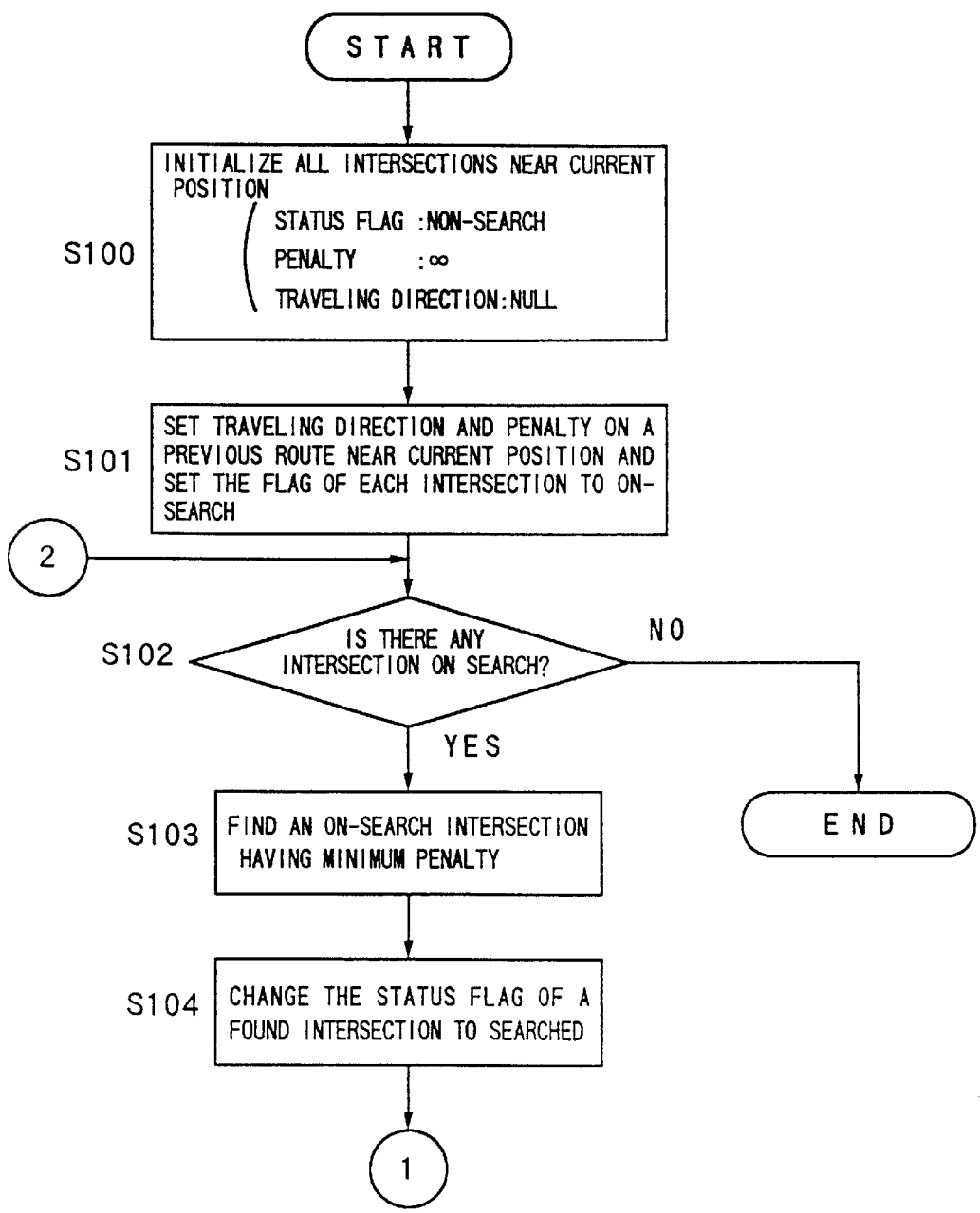
FIG. 12 is a flow chart for calculating the traveling direction of a vehicle and penalty at each intersection in a direction in which the vehicle returns to a previous route.
Figure 13:
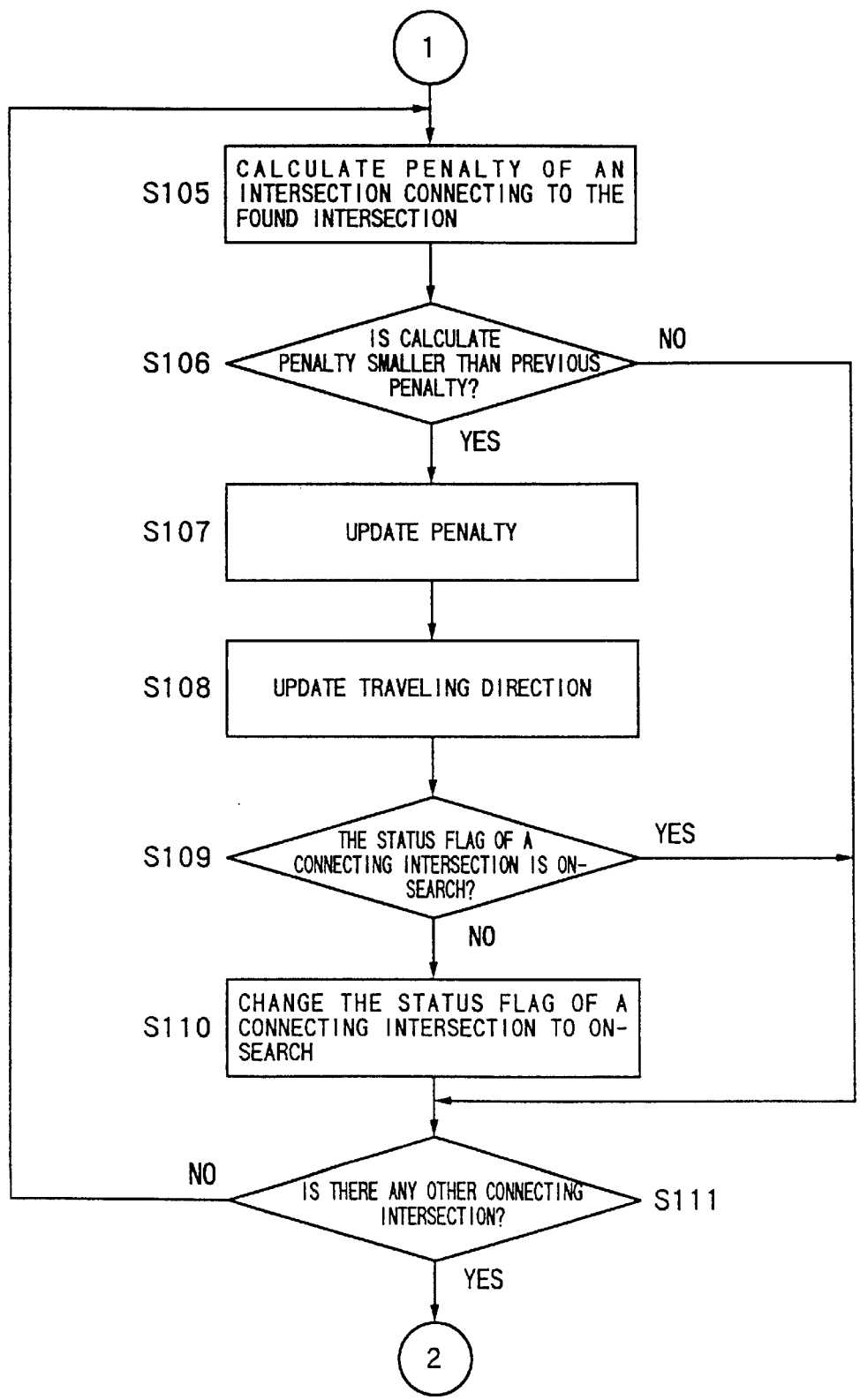
FIG. 13 is a flow chart continued from FIG. 12.

FIGS. 12 and 13 show a subroutine for calculating a traveling direction of a vehicle at each intersection in a direction to return to a previous route and a related penalty. First, all the intersections near a current position are initialized in order to set the status flag to non-search, the penalty to ∞, and the traveling direction to null (S100). The status flag mentioned here is a flag for indicating whether search for a route is being done. The flag is switched over according to the search status, that is, non-search (0), on-search (1) or searched (2). A traveling direction and a penalty are set on each of the intersections on the previous route near the current position, and the on-search flag is set for those intersections (S101). Presence of an intersection being on search is determined (S102), and if intersections on search are found, then an intersection having minimum penalty is searched for (S103). If such an intersection is found, the status flag of that intersection is changed to the searched (S104). Then, the penalty of an intersection connecting to that intersection is calculated (S105).

Whether or not a calculated penalty is smaller than a previous penalty is determined (S106), and if the calculated penalty is larger than the previous penalty, whether there is any other connecting intersection is determined (S111). If the calculated penalty is smaller than the previous penalty, updating of the penalty (S107) and updating of the traveling direction (S108) are performed. Whether or not the status flag of a connecting intersection is on-search is determined (S109), and if it is on-search, whether or not there is any other connecting intersection is determined (S111). If the connecting intersection is not on-search, the status flag of that connecting intersection is changed to on-search (S110). After that, whether or not there is any other intersection is determined (S111). If there is no other intersection, processing returns to the step S105, in which a penalty of an intersection connecting to that intersection is calculated and the processing of the steps S106–S110 is executed according to the result thereof. On the other hand, if there is any other connecting intersection, processing returns to the step S102, in which whether or not there is any intersection on search is determined and the processing terminates.

Figure 15:
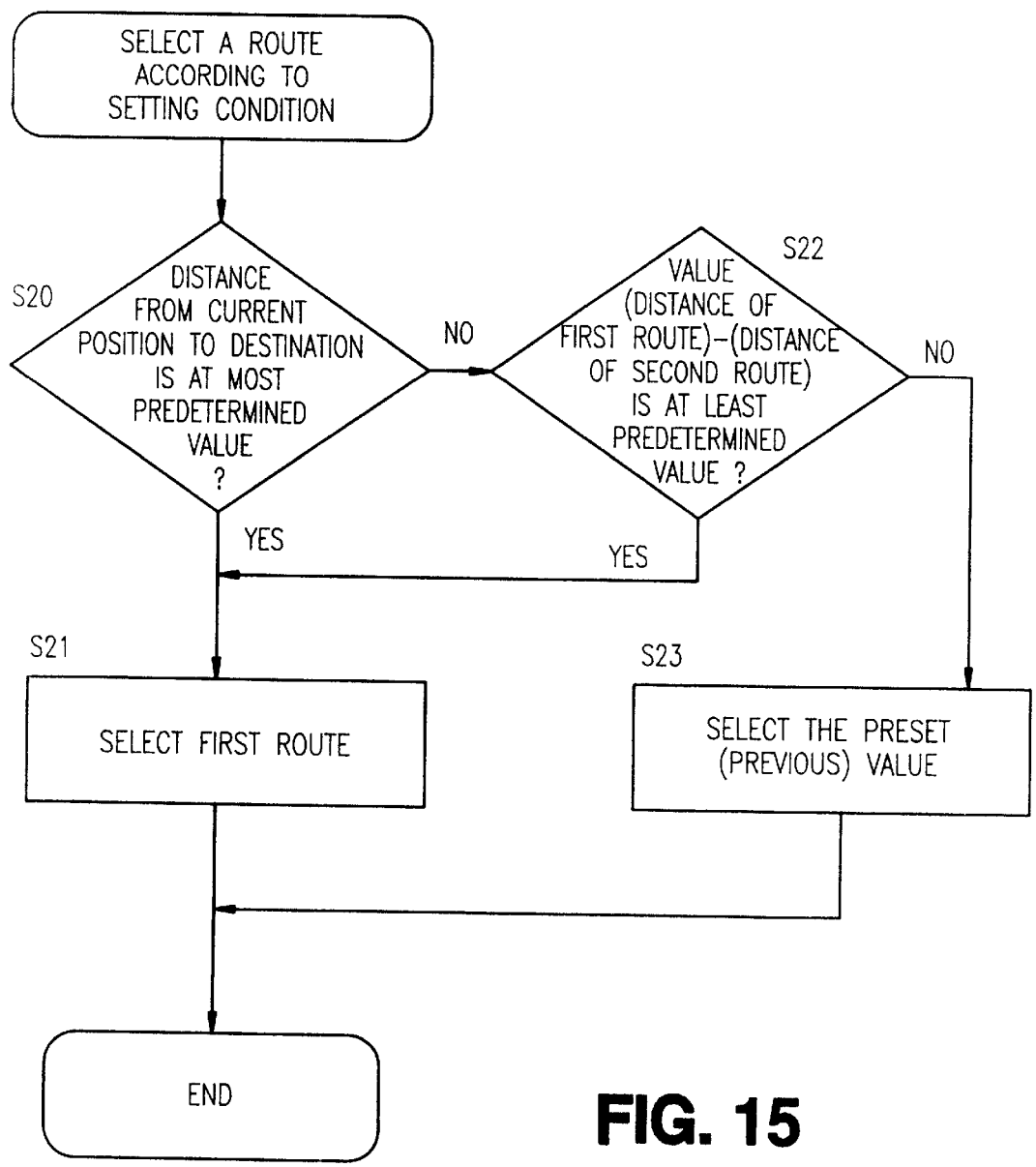
FIG. 15 is a flow chart of processing for selecting a route by comparing the distances of respective routes found according to the first embodiment.
Figure 16:
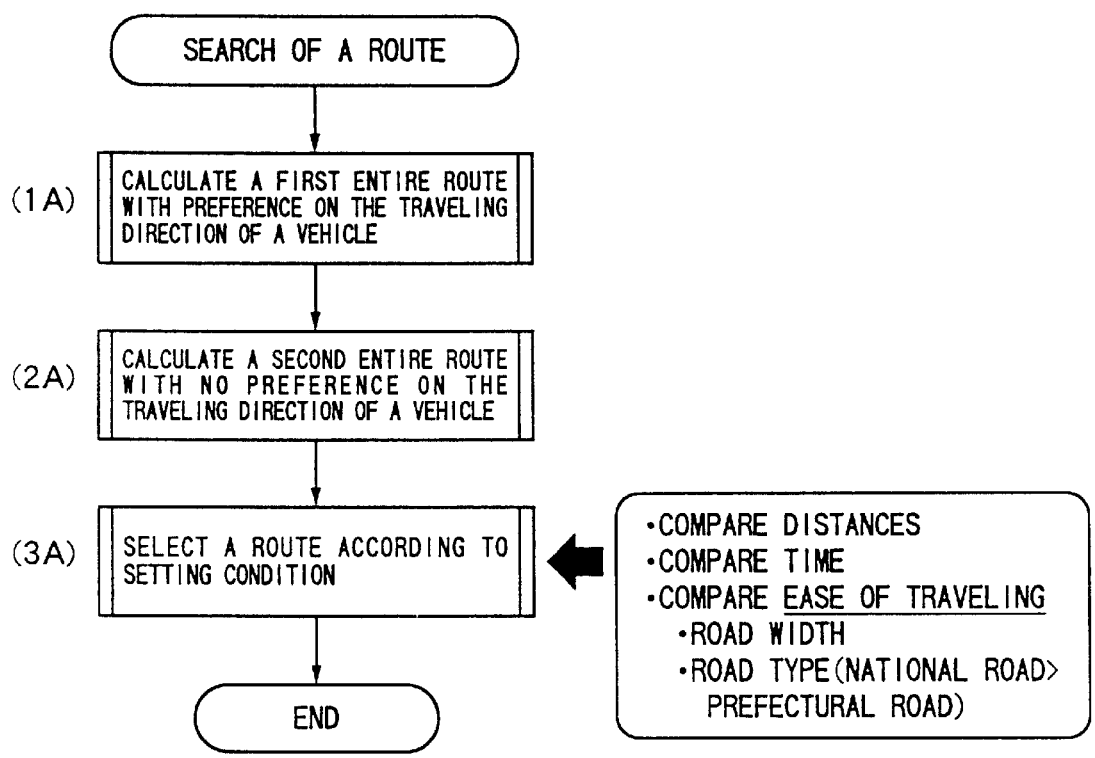
FIG. 16 is a flow chart for searching for a route.

As an example of selection of a route, a method for determining a route according to a distance from a current position to a destination will be described. Referring to FIG. 15, whether or not a distance from the current position to the destination is at most a predetermined value, that is, not more than the predetermined value, is determined (S20). In this case, whether the distance of the first route is at most the predetermined value is determined, and if so, the first route is selected (S21). When the distance of the first route is greater than the predetermined value, whether or not the value of the distance of the first route minus that of the second route is at least the predetermined value is determined (S22). Although the first route cannot be chosen with reference to only the distance of the first route, when there is not so much difference between the distance of the first route and that of the second route, namely when a value calculated at the step S22 is less than the predetermined value, the first route is chosen (S21). If a value calculated at the step S22 is at least the predetermined value, the first route is selected (S23).

According to the present embodiment, whether or not the distance from a current position to a destination is at most a predetermined value is determined at the step S20 and the first route is selected according to the result thereof. Otherwise, whether or not the difference between the distance of the first route and that of the second route is at least the predetermined value is further determined, and the first route or a previous route is selected depending on the result thereof. A conventional system not having the step S20 selects the first route or the previous route according to the result of determination at the step S22. In such a system, if the distance from the current position to a destination is relatively small, the previous route is selected even though a driver expects that the first route, different from the previous route, will be selected. However, according to the present embodiment, the step S20 determines a distance from the current position to the destination before the differences of the distances of respective routes are compared with a predetermined value. When the distance from the current position to a destination is relatively small, the first route is selected regardless of the second route. Thus, the above-mentioned problem of the prior art is solved so that a vehicle can be guided along a route which a driver is satisfied with.

Although, in the above-mentioned embodiment, the first and second routes are searched for taking a previous route into account, it is permissible to search for all routes without taking the previous route into account.

Additionally, the system of the present invention may be modified as follows.

(1) It is permissible to construct this system so as to display the second route without selecting a previous route if the remaining distance of the first route up to a destination is longer than the remaining distance of the second route by at least a predetermined distance. In this case, the system will be more convenient for a driver if positions in which U-turn is possible are stored in memory as data (weight, etc.).

(2) It is permissible to construct the system so as to display the previous route without displaying the first and second routes if the distance of the first route up to a previous route is longer than the distance up to the second route by at least a predetermined distance and, further, so as to display the first route if the distance of the first route up to the previous route is not longer than the distance up to the second route by at least the predetermined distance.

Second Embodiment

The second embodiment of the navigation system searches for an entire route all the way from a current position to a destination. The entire route search is performed, for example, when data of a current position and a destination are initialized.

On a destination setting screen, a search condition is set and then search of a route (step S1 in FIG. 7) is executed. In this route search, calculation of a first entire route (first route) with preference for the traveling direction of a vehicle (1A) and calculation of a second entire route (second route) with no preference for the traveling direction thereof are performed. The calculated first route or calculated second route is selected (3A) depending on the setting condition. It is herein assumed that the setting condition is the same as in the first embodiment.

Figure 17:
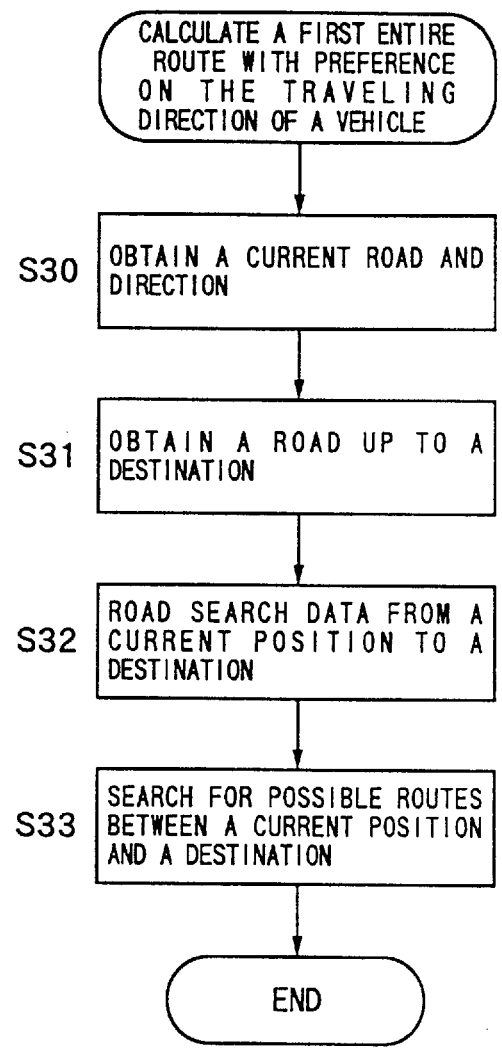
FIG. 17 is a flow chart of a subroutine for calculating the first route with preference for the traveling direction of a vehicle.

FIG. 17 shows a routine for calculating a first entire route with preference for a traveling direction of a vehicle. According to current position information from the current position detecting device and map information from the information memory unit, the road where the vehicle is currently located and the traveling direction thereof are obtained (S30), then a road up to a destination is obtained (S31) and search data between the current position and the destination are read (S32). Successively, possible routes between the current position and the destination are searched for according to setting condition (S33).

Figure 18:
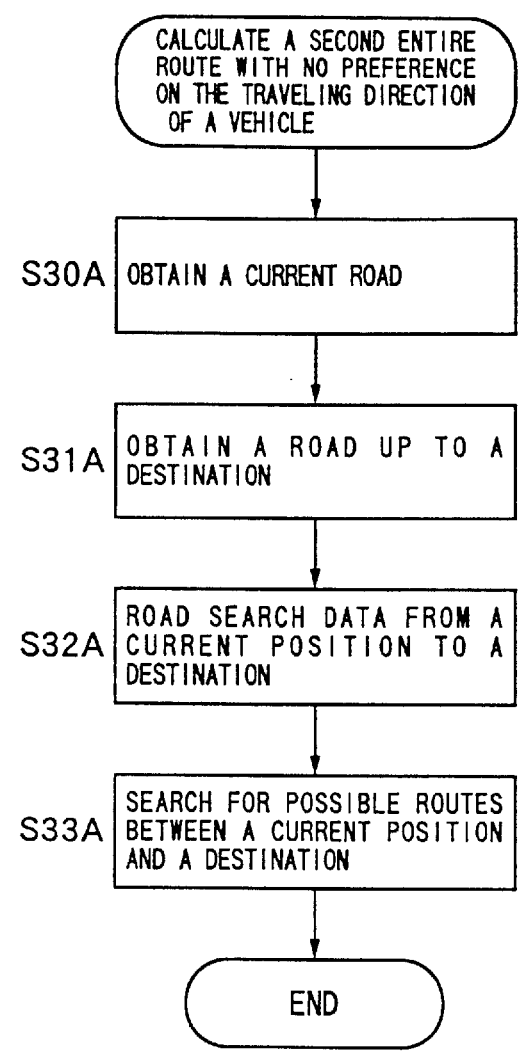
FIG. 18 is a flow chart of a subroutine for calculating the second route with no preference for the traveling direction of a vehicle.

Likewise, an second entire route with no preference on the traveling direction thereof is searched for according to the steps S30A–S33A shown in FIG. 18.

Figure 19:
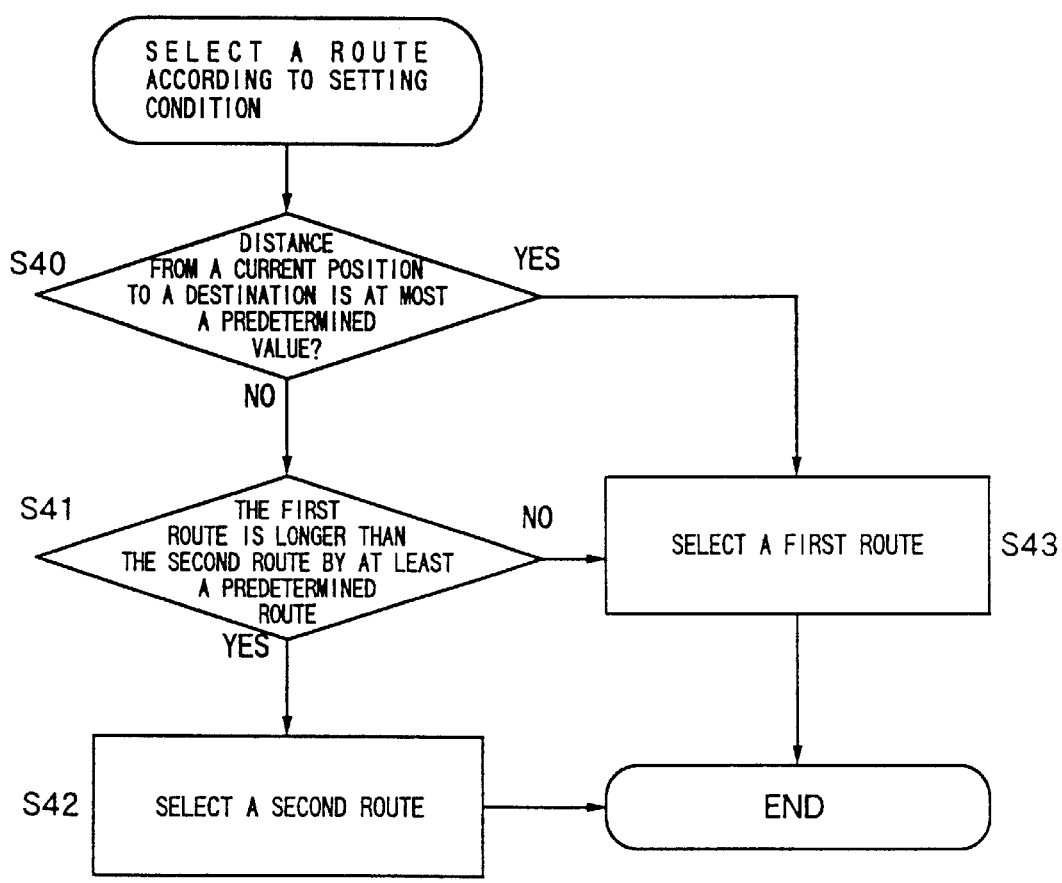
FIG. 19 is a flow chart of processing for selecting a route by comparing the distances of respective routes found according to the second embodiment.

Route selection will be described with reference to an example where a route is determined according to a distance from a current position to a destination. As shown in FIG. 19, it is determined whether or not a distance from the current position to the destination is at most a predetermined value, that is, not more than a predetermined value (S40). In this case, it is determined whether the distance of the first route is at most a predetermined value. If this is affirmed, the first route is selected (S43). If the distance of the first route is greater than the predetermined value, it is then determined whether or not the distance of the first route is longer than that of the second route by at least the predetermined value (S41). If the first route is not longer than the second route by at least the predetermined value, the first route is selected (S43). If the first route is longer than the second route by at least the predetermined value, the second route is selected (S42).

The invention in its broader aspects is not limited to the specific details of the preferred embodiments shown and described, and those skilled in the art will recognize that the invention can be practiced with modification within the spirit and scope of the appended claims.

What is claimed is:

1. A navigation system for providing route guidance to a destination in accordance with a preset route, comprising:

memory means for storing map information and guidance information;

current position detecting means for detecting current position of a vehicle and traveling direction thereof;

route search means for searching to determine a route from the detected current position to a destination on the basis of information stored in said memory means and for storing the determined route as the preset route;

route-off detecting means for determining whether the vehicle is off of the preset route on the basis of the result of the detecting of current position by said current position detecting means and information in said memory means;

re-search means for re-searching for a new route, from the detected current position to the destination, on the basis of information in said memory means responsive to a determination by said route-off detecting means that the vehicle is off the preset route, said re-search means including:

first route search means for searching for a first re-search route forward, in the detected traveling direction, from the detected current position of the vehicle;

second route search means for searching for a second re-search route without giving priority to the forward traveling direction of the vehicle; and comparative determining means for determining a difference in distance between the first and second re-search routes and for selecting said second re-search route when the difference in distance between said first and second re-search routes is greater than a predetermined value, and for selecting said first re-search route when the difference is less than the predetermined value; and guide means for providing guidance by reading guidance information from said memory means based on one of said preset and new routes.

2. The navigation system of claim 1 wherein said first and second routes each include return to said preset route.

3. A navigation system for providing route guidance to a destination in accordance with a preset route, comprising:

memory means for storing map information and guidance information;

current position detecting means for detecting current position of a vehicle and traveling direction thereof;

route determination means for searching to determine a route from the detected current position to a destination on the basis of information stored in said memory means and for storing the determined route as the preset route;

said route determination means including:

first route search means for searching for a first route forward, in the detected traveling direction, from the detected current position of the vehicle;

second route search means for searching for a second route without giving priority to the forward traveling direction of the vehicle;

comparative determining means for determining a difference in distance between said first and second routes, for selecting said second route when the difference in distance between said first and second routes is greater than a predetermined value, and for selecting said first route when the difference is less than the predetermined value; and guide means for providing route guidance based on the determined route.

4. A navigation system for providing route guidance to a destination along a preset route, comprising:

storage means for storing map information and guidance information;

first detector means for detecting current position of a vehicle and travel direction thereof and for outputting a first signal indicative of the detected current position and travel direction;

route search means for searching to determine a route to the destination from the detected current position based on the information stored in said storage means and for storing the determined route as the preset route;

second detector means for detecting a deviation from the preset route, responsive to said first detection signal, by reference to information contained in said storage means, and for generating a second detection signal when the vehicle is detected to have deviated from the preset route;

re-search means, responsive to receipt of the second detection signal, for searching to determine a new route to the destination from the detected current position, based on the information stored in said storage means, said re-search means including:

first route search means for searching for a first route forward, in the detected travel direction, from the detected current position of the vehicle to the destination;

second route search means for searching for a second route from the detected current position to the destination without giving priority to the forward travel direction of the vehicle; and comparison means for setting a distance as one criterion for use in selecting a route, for determining a difference between distance of said first route minus distance of said second route, for determining that said one criterion is satisfied when said difference between distance of said first route minus distance of said second route is at least a predetermined value, for setting another distance as another criterion, for determining that another criterion to be satisfied if distance between the detected current position and the destination is less than or equal to said another distance and, if said another criterion is not satisfied, for proceeding to determine if said one criterion is satisfied; and guidance means for providing route guidance for one of the preset and first routes by reading from said storage means a corresponding part of the guidance information, said guidance means providing route guidance based on the first route when said another criterion is satisfied and providing route guidance based on the first route when said one criterion is not satisfied.

5. The navigation system of claim 4 wherein said first and second routes each include return to said preset route.

6. A navigation system for providing route guidance to a destination in accordance with a preset route, comprising:

memory means for storing map information and guidance information;

current position detecting means for detecting current position of a vehicle and traveling direction thereof;

route search means for searching to determine a route from the detected current position to a destination on the basis of information stored in said memory means and for storing the determined route as the preset route;

route-off detecting means for determining whether the vehicle is off of the preset route on the basis of the result of the detecting of current position by said current position detecting means and information in said memory means;

re-search means for re-searching for a new route, from the detected current position to the destination, on the basis of information in said memory means responsive to a determination by said route-off detecting means that the vehicle is of the preset route, said re-search means including:

first route search means for searching for a first re-search route forward, in the detected traveling direction, from the detected current position of the vehicle;

second route search means for searching for a second re-search route without giving priority to the forward traveling direction of the vehicle; and comparative determining means for determining required travel time for the first and second re-search routes, for selecting said second re-search route when a difference between the required travel times for said first and second re-search routes is treater than a predetermined value, and for selecting said first re-search route when the difference is less than the predetermined value; and guide means for providing guidance by reading guidance information from said memory means based on one of said preset and new routes.

7. A navigation system for providing route guidance to a destination in accordance with a preset route, comprising:

memory means for storing map information and guidance information;

current position detecting means for detecting current position of a vehicle and traveling direction thereof;

route determination means for searching to determine a route from the detected current position to a destination on the basis of information stored in said memory means and for storing the determined route as the preset route;

said route determination means including:

first route search means for searching for a first re-search route forward, in the detected traveling direction, from the detected current position of the vehicle;

second route search means for searching for a second re-search route without giving priority to the forward traveling direction of the vehicle;

comparative determining means for determining required travel times for said first and second routes, for selecting said second re-search route when a difference between the required travel times for said first and second re-search routes is greater than a predetermined value, and for selecting said first research route when the difference is less than the predetermined value; and guide means for providing route guidance based on the determined route.

* * * * *

UNITED STATES PATENT AND TRADEMARK OFFICE
CERTIFICATE OF CORRECTION

PATENT NO. : 5,774,073
DATED : June 30, 1998
INVENTOR(S) : MAEKAWA et al

It is certified that error appears in the above-indentified patent and that said Letters Patent is hereby corrected as shown below:

Col. 1, line 30, "the-aforementioned" should read --the aforementioned--.

Col. 7, line 15, "measured-and" should read --measured and--.

Col. 8, line 58, "RAN42" should read --RAM42--.

Col. 14, line 23, "treater" should read --greater--.

Signed and Sealed this

Twenty-seventh Day of April, 1999

Attest:

Q. TODD DICKINSON

*Attesting Officer*      *Acting Commissioner of Patents and Trademarks*